United States Patent [19]

Mesnel

[11] 4,310,164
[45] Jan. 12, 1982

[54] COMPOSITE REINFORCED SEALING STRIP

[75] Inventor: François Mesnel, Neuilly-sur-Seine, France

[73] Assignee: Establissements Mesnel, Carrieres-sur-Seine, France

[21] Appl. No.: 96,316

[22] Filed: Nov. 21, 1979

[30] Foreign Application Priority Data

Mar. 30, 1979 [FR] France .................. 79 08136

[51] Int. Cl.³ .................. F16J 15/12; E06B 7/16
[52] U.S. Cl. .................. 277/189; 277/229; 277/231; 49/475; 52/718; 296/93
[58] Field of Search ........ 277/166, 189, 227, 229–232, 277/228, DIG. 6, 235 R, 206 R; 52/403, 716–718; 296/93; 49/475, 482, 488, 490, 491

[56] References Cited

U.S. PATENT DOCUMENTS

| 916,805 | 3/1909 | Van Nostrand | 277/229 X |
|---|---|---|---|
| 1,151,344 | 8/1915 | Crane | 277/229 |
| 1,325,955 | 12/1919 | Payne | 277/229 |
| 1,695,682 | 12/1928 | Creamer | 277/229 X |
| 4,183,778 | 1/1980 | Mesnel | 156/245 |

FOREIGN PATENT DOCUMENTS

| 1323108 | 2/1963 | France . | |
|---|---|---|---|
| 1433467 | 2/1965 | France . | |
| 2283299 | 3/1976 | France | 277/231 |
| 2324852 | 4/1977 | France . | |
| 1450730 | 9/1976 | United Kingdom | 277/230 |

Primary Examiner—Robert S. Ward, Jr.
Attorney, Agent, or Firm—Schwartz, Jeffery, Schwaab, Mack, Blumenthal & Koch

[57] ABSTRACT

Composite reinforced sealing strip, for use for example on an automobile body, the strip being made up of a sealing part and of a U-shaped gripping part integrally connected lengthwise to the sealing part and a reinforcing armature embedded in the gripping part. This armature has a body which is formed of a series of spaced parallel U-shaped elements with connecting struts joining only the bights of two elements of consecutive pairs of elements and other connecting struts joining only the adjacent legs of the consecutive pairs of elements. Thus, the first and second elements of every three consecutive elements are joined together solely at the bights and the second and third elements are joined together solely at the legs.

24 Claims, 8 Drawing Figures

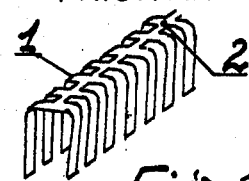
PRIOR ART
Fig. 1
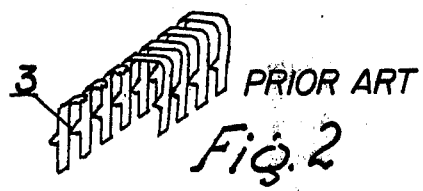
PRIOR ART
Fig. 2
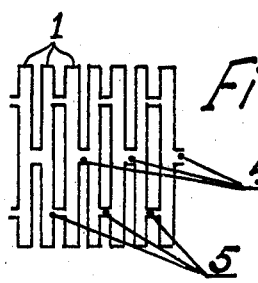
Fig. 3
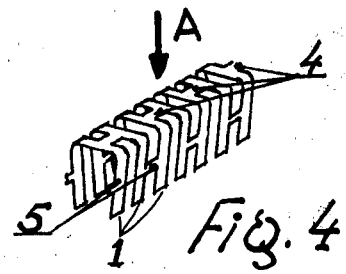
Fig. 4
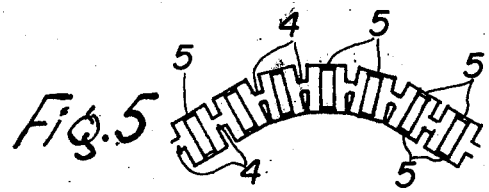
Fig. 5
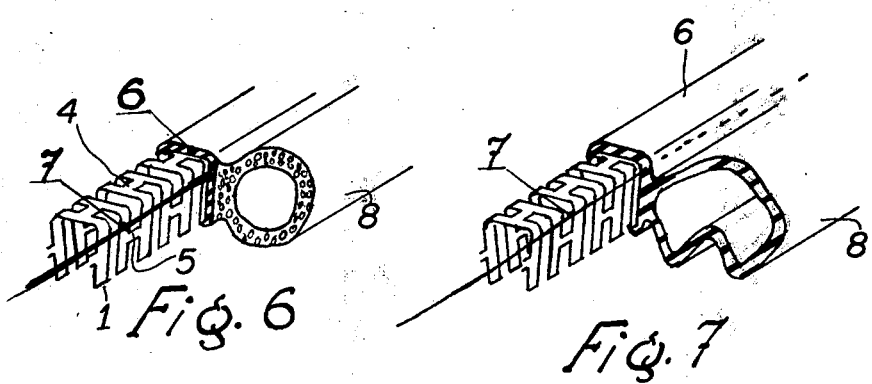
Fig. 6
Fig. 7
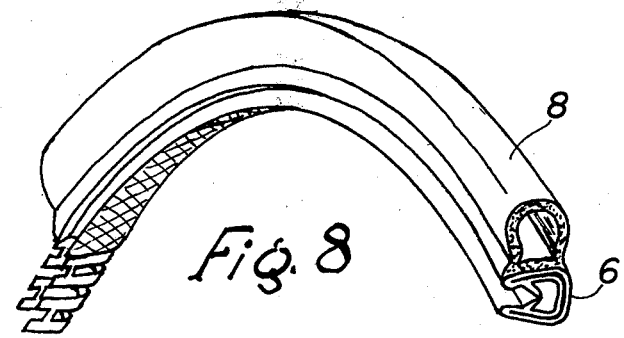
Fig. 8

COMPOSITE REINFORCED SEALING STRIP

The present invention relates to a composite sealing strip joint for use, for example, on a vehicle body, more particularly around the doors thereof.

Numerous composite joints of the above type are known for use particularly on an automobile body. Each joint comes in the form of a strip made of two shaped parts extending and connected together in lengthwise direction. They are extruded either together or separately out of plastics material. One part is a hollow sealing extrusion and the other is a U-shaped extrusion adapted to be fixed, by gripping action, along the edge of an automobile body plate such as around a door opening. This gripping action is strengthened by means of a web, that is, by a metal reinforcement or armature located in the center of this U-shaped part so as to be embedded therein during extrusion. A process for joining two lengths of such strips is disclosed in my prior U.S. application Ser. No. 851,255, of Nov. 14, 1977, now U.S. Pat. No. 4,183,778.

Such known metal reinforcement or armature is usually cut out in the shape of fish bones or may even be made up of successive broken or severed bits. It has however been observed, for a long time, that the use of such armature does not prevent deformation and particularly collapsing of the hollow sealing extrusion where sharp curves occur. The result of course is that sealing is inadequate, in such areas, between the surfaces to be sealed. An attempt to remedy this situation has been made by the insertion of internal reinforcement in the noted area or else injection in situ of flexible cellular material reticulating at ambient temperature. These processes are yet fairly expensive.

It is an object of the present invention to avoid the aforementioned disadvantage and this object is achieved, according to the present invention, by the provision in such a composite reinforced sealing strip of a reinforcing armature embedded in the gripping part of the strip and comprising: a body formed of a series of like-oriented spaced parallel U-shaped elements each having a central bight and two legs depending therefrom, connecting struts joining only the bights of two elements of consecutive pairs of elements and further connecting struts joining only the adjacent legs of said consecutive pairs of elements whereby the first and second elements of every three consecutive elements are joined together solely at the bights and the second and the third elements are joined together solely at the legs. Also according to the invention, the composite sealing strip with the above-mentioned armature is provided with an elongated practically inextensible non-metallic strand-like member embedded between the sealing and gripping parts to extend longitudinally thereof.

Preferably, the struts of the aforesaid armature join the bights at the center thereof and the legs likewise at the center thereof.

Embodiments of the invention are described hereinafter with respect to the appended drawings wherein;

FIG. 1 is a perspective view of a length of a metal armature of the usual type, for the reinforcement of a U-shaped gripping member;

FIG. 2 is a perspective view of a length of a likewise known U-shaped metal armature of another type;

FIG. 3 is a plan view of a length of a metal strip, cut out to form the armature of a U-shaped gripping member according to the present invention;

FIG. 4 is a perspective view of the metal strip of FIG. 3 after being bent into a U and ready to be embedded during extrusion of the gripping member;

FIG. 5 is a top plan view of the armature of FIG. 4, taken in the direction of the arrow thereof, intended to show its reaction when used in a sharp bend;

FIG. 6 is a perspective view of a length of composite elongated sealing strip made according to the invention with a portion of the embedding material of the gripping portion removed to show its armature and to show the hollow sealing portion and a substantially inextensible thread generally between the two portions but, as clearly shown in FIGS. 6 and 7, embedded in the material of the gripping portion;

FIG. 7 is another embodiment of a sealing strip also made according to the teaching of the present invention, and FIG. 8 is a perspective view of a sealing strip made according to the invention intended to show its use in a sharp bend, illustrating that the sealing portion is not collapsed.

Referring now to the drawings, FIG. 1 shows a known metal armature for a joint called fish-bone joint, this armature being embedded during the extrusion of the U-shaped gripping part of the joint, as is likewise known. In this type of joint, the U-shaped elements are connected together at the bight by struts 2.

In FIG. 2, likewise referring to a known armature, the bight struts 2 of FIG. 1 have been replaced by lateral struts 3 which comprise predetermined weakened spots so that they can thus easily break.

It is proper to recall that, in both the cases of FIGS. 1 and 2, the arrangement shown may not adequately avoid collapsing of the hollow sealing part of the joint when the latter is used in a sharp curve.

To the contrary, the novel type of metal armature made according to the invention and shown in FIG. 3 is able to avoid such collapse when used in a U-shaped extruded gripping joint part. This armature is characterized by the use of staggered perforations suitable to create, on the one hand, central connecting struts 4 ingeniously spaced and, on the other hand, lateral struts 5, likewise spaced. The armature is then bent in the form of a U as shown in FIG. 4.

FIG. 5 is intended to illustrate that when an armature made according to the invention is used in a sharp turn, it will offer but very little resistance to the bending movement.

FIG. 6 illustrates a body sealing joint obtained by double extrusion, in a known manner, of a compact elastomer gripping part 6 embedding the perfected metal armature of the invention and, on the other hand, of a hollow sealing part 8 advantageously cellular or pitted. Simultaneously, there is extruded in the area adjacent the aforementioned two joint parts, a thread 7 that may be practically inextensible.

FIG. 7 illustrates a different embodiment which generally shows the same combination and differs only from that of FIG. 6 in that the double extrusion uses the same material which, here, is of compact nature for achieving the simultaneous extrusion of the two parts as is well known.

In both cases, the thread 7 may be made of viscose or fiber glass with an appropriate adherence layer to ensure proper binding with the extruded materials. The addition of such a thread 7 gives the joints, thus perfected, a new and original quality by creating in the joint a privileged and predetermined bending zone according to what is called the mean fibers thereby appreciably reducing any tendency of the joints to deform or collapse, as illustrated in FIG. 8.

In this respect, it may be specified that, for instance, to ensure compatibility of a viscose or fiber glass wire with the extruded elastomers, one may use the treatment known as the formol resorcine resin treatment. If the gripping part is extruded out of P.V.C. material and as is also known, it is then a covering of vinyl resin that will provide the required bond. In all cases, the field of the invention may extend, namely, to doubling up the number of inextensible wires 7 in order to more accurately locate and control the mean bending zone of the sealing joint of the invention.

While this may be obvious, it is further specified that the invention is not to be limited to the sole features and sole processes explicitly described by way of examples to materialize the invention but, to the contrary, its field expressly extends to all variants of execution and, particularly, to those making use of equivalent or simply comparable means and processes in order to achieve the industrial products characterizing the present invention or even a portion of such products.

By way of example, such variants explicitly to be contained in the invention may consist in not only tripling the inextensible threads but substituting ribbons therefor.

I claim:

1. A composite reinforced sealing strip, for use for example on a vehicle body, said strip comprising:
   a sealing part and a U-shaped gripping part integrally connected together lengthwise thereof;
   a reinforcing armature embedded in said U-shaped gripping part and comprising: a body formed of a series of like-oriented spaced parallel U-shaped elements each having a central bight and two legs depending therefrom, connecting struts joining only the bights of the two elements of consecutive pairs of elements and further connecting struts joining only the adjacent legs of said consecutive pairs of elements, whereby the first and second elements of every three consecutive elements are joined together solely at the bight and the second and third elements are joined together solely at the legs, and
   an elongated substantially inextensible member embedded between said parts to extend longitudinally thereof.

2. A sealing strip as claimed in claim 1, wherein the struts join the bights at the center thereof and the legs likewise at the center thereof.

3. A sealing strip as claimed in claim 1 or claim 2, wherein said inextensible member is a thread.

4. A sealing strip as claimed in claim 1 or in claim 2 wherein said inextensible member is a ribbon.

5. A composite reinforced sealing strip, for use for example on a vehicle body, said strip comprising:
   a sealing part and a U-shaped gripping part integrally connected together lengthwise thereof, said gripping part being composed of an extruded material;
   a reinforcing armature embedded in said U-shaped gripping part and comprising: a body formed of a series of like-oriented spaced parallel U-shaped elements each having a central bight and two legs depending therefrom, connecting struts joining only the bights of the two elements of consecutive pairs of elements and further connecting struts joining only the adjacent legs of said consecutive pairs of elements, whereby the first and second elements of every three consecutive elements are joined together solely at the bight and the second and third elements are joined together solely at the legs; and
   means for reducing any tendency of the sealing strip to collapse by controlling the extent to which the sealing strip may bend, said reducing means including an inextensible strand which is embedded in said extruded material of said gripping part and which extends lengthwise of said gripping part.

6. A sealing strip as claimed in claim 5, wherein said extruded material of said gripping part is an elastomer.

7. A sealing strip as claimed in claim 6, wherein said inextensible strand is a viscose wire.

8. A sealing strip as claimed in claim 6, wherein said inextensible strand is a fiberglass wire.

9. A sealing strip as claimed in claim 7 or 8, wherein said inextensible strand is treated with formol resorcine resin to effect binding with said extruded elastomer material.

10. A sealing strip as claimed in claim 5, wherein said extruded material of said gripping part is PVC.

11. A sealing strip as claimed in claim 10, wherein said inextensible strand is a viscose wire.

12. A sealing strip as claimed in claim 10, wherein said inextensible strand is a fiberglass wire.

13. A sealing strip as claimed in claim 11 or 12, wherein said inextensible member is bound to said PVC material by a binder of vinyl resin.

14. A composite reinforced sealing strip, for use for example on a vehicle body, said strip comprising:
   a sealing part and a U-shaped gripping part integrally connected together lengthwise thereof, said gripping part being composed of an extruded material;
   a reinforcing armature embedded in said U-shaped gripping part and comprising: a body formed of a series of like-oriented spaced parallel U-shaped elements and connecting struts joining consecutive pairs of elements, each U-shaped element having a central bight and two legs depending therefrom; and
   means for reducing any tendency of the sealing strip to collapse by controlling the extent to which the sealing strip may bend, said reducing means including an inextensible strand which is embedded in said extruded material of said gripping part and which extends lengthwise of said gripping part.

15. A sealing strip as claimed in claim 14, wherein said extruded material of said gripping part is an elastomer.

16. A sealing strip as claimed in claim 15, wherein said inextensible strand is a viscose wire.

17. A sealing strip as claimed in claim 15, wherein said inextensible strand is a fiberglass wire.

18. A sealing strip as claimed in claim 16 or 17, wherein said inextensible strand is treated with formol resorcine resin to effect binding with said extruded elastomer material.

19. A sealing strip as claimed in claim 14, wherein said extruded material of said gripping part is PVC.

20. A sealing strip as claimed in claim 19, wherein said inextensible strand is a viscose wire.

21. A sealing strip as claimed in claim 19, wherein said inextensible strand is a fiberglass wire.

22. A sealing strip as claimed in claim 20 or 21, wherein said inextensible member is bound to said PVC material by a binder of vinyl resin.

23. A sealing strip as claimed in claim 5 or 2, wherein said inextensible member is a viscose thread.

24. A sealing strip as claimed in claim 5 or 2, wherein said inextensible member is a fiber glass thread.

* * * * *